(12) United States Patent
Valvo et al.

(10) Patent No.: US 7,289,507 B2
(45) Date of Patent: Oct. 30, 2007

(54) METHOD AND NETWORK ELEMENT FOR A SAFETY TRANSPORT OF ETHERNET FRAMES OVER A TRANSPORT SDH/SONET NETWORK

(75) Inventors: Gaetano Valvo, Milan (IT); Mirko Despini, Colnago (IT); Massimiliano Lando, Lazzate (IT)

(73) Assignee: Alcatel, Paris (FR)

( * ) Notice: Subject to any disclaimer, the term of this patent is extended or adjusted under 35 U.S.C. 154(b) by 969 days.

(21) Appl. No.: 10/354,958

(22) Filed: Jan. 31, 2003

(65) Prior Publication Data

US 2003/0161320 A1 Aug. 28, 2003

(30) Foreign Application Priority Data

Feb. 22, 2002 (EP) .................................. 02290445
Mar. 20, 2002 (EP) .................................. 02290701

(51) Int. Cl.
 *H04L 12/28* (2006.01)
(52) U.S. Cl. ...................................... 370/394; 370/907
(58) Field of Classification Search .................... None
 See application file for complete search history.

(56) References Cited

U.S. PATENT DOCUMENTS

| | | | |
|---|---|---|---|
| 6,122,281 A | 9/2000 | Donovan et al. | |
| 6,189,122 B1 | 2/2001 | Cheng | |
| 6,335,933 B1* | 1/2002 | Mallory | 370/394 |
| 6,370,579 B1* | 4/2002 | Partridge | 709/226 |
| 6,434,118 B1* | 8/2002 | Kirschenbaum | 370/236.1 |
| 6,714,516 B1* | 3/2004 | Todd | 370/235 |
| 6,917,630 B1* | 7/2005 | Russell et al. | 370/532 |
| 6,993,026 B1* | 1/2006 | Baum et al. | 370/392 |
| 2001/0043603 A1 | 11/2001 | Yu | |
| 2002/0196792 A1* | 12/2002 | McNeil et al. | 370/401 |
| 2003/0007513 A1* | 1/2003 | Barker et al. | 370/476 |

FOREIGN PATENT DOCUMENTS

| | | |
|---|---|---|
| EP | 0 924 901 A2 | 6/1999 |
| EP | 0 982 900 A2 | 3/2000 |
| WO | WO 01/15363 A1 | 3/2001 |

OTHER PUBLICATIONS

Armstrong T et al: "GFP For Ethernet" Contribution to T1 Standards project, XX, XX, Jul. 10, 2000, pp. 1-6, XP000949000.
"Series G: Transmission Systems and Media, Digital Systems and Networks Types and Characteristics of SDH network Protection architectures" ITU-T Recommendation G.841, XX, XX, Oct. 1998, page Complete XP000955617.

* cited by examiner

*Primary Examiner*—Andrew C. Lee
*Assistant Examiner*—Clemence Han
(74) *Attorney, Agent, or Firm*—Sughrue Mion, PLLC

(57) ABSTRACT

Disclosed is a method and network element for providing a safe transport of Ethernet frames over a transport SDH/SONET network. The method is characterized by comprising: at the sending point (AP#0), receiving Ethernet frames to be transported through an Access Point (AP#0); mapping the Ethernet frames into Virtual Containers (VC-X #); assigning (FA) a label to every frame according to a sequence; storing a copy of the sent labeled frames; and at the receiving point (AP#1), receiving the sent labeled frames; re-ordering (FR) the received frames according to the assigned sequence label; updating the value of a pointer according to the label of the last correct frame of the sequence; and outputting the frames through an Access Point (AP#1).

10 Claims, 2 Drawing Sheets

METHOD AND NETWORK ELEMENT FOR A SAFETY TRANSPORT OF ETHERNET FRAMES OVER A TRANSPORT SDH/SONET NETWORK

INCORPORATION BY REFERENCE OF PRIORITY DOCUMENT

This application is based on, and claims the benefit of, European Patent Applications No. 02290445.2 filed on Feb. 22, 2002 and 02290701.8 filed on Mar. 20, 2002, which are incorporated by reference herein.

BACKGROUND OF THE INVENTION

1. Field of the Invention

The present invention relates to the telecommunication field and in particular to a method and network element for transporting Ethernet frames over a transport SDH/SONET network. Still more in particular, the present invention relates to a method and network element allowing the retransmission of Ethernet frames over a SDH/SONET network.

As it is known, traffic generated by an Ethernet apparatus is characterized by discontinuities, namely there are periods with a more or less constant sending rate of Ethernet packets and periods during which a rather long time is provided between a received Ethernet frame and the next one. Such unstable/inconstant traffic is generally termed "bursty". On the contrary, SDH or SONET traffic is characterized by a constant sending/receiving rate. In other words, any network element of a transport SDH/SONET network sends corresponding frames with a regular and constant rate. Furthermore, Ethernet frames do not have a fixed length/size but only a maximum size (1518 bytes).

It is easy to understand that these discrepancies result in a highly difficult interfacing of two technologies having different natures/characteristics.

2. Description of the Prior Art

An already available solution to the above problem allows the mapping of Ethernet frames into SDH/SONET Virtual Containers as a transparent tributary; all incoming bits are transported to the output interface with the related timing information (frequency for recovering the proper bit rate at the reception side). Within the SDH/SONET payload also the dead times between a received Ethernet frame and the following one are mapped.

The general problem of transporting Ethernet frames over a SONET/SDH transport network is presently solved through SONET/SDH virtual concatenation.

Sometimes, Ethernet frames could become lost in the network for different reasons, for instance because of a fail in the network. At present, the step of Ethernet re-transmission is managed at a higher layer level but, due to such a higher layer management, the re-transmission of Ethernet frames is a rather long procedure and it could not be performed in an efficient manner.

Thus, there still remain the problem of how to perform a low-layer and fast retransmission of Ethernet frames that have been lost along their transport over the SDH/SONET network.

SUMMARY OF THE INVENTION

In view of the above main problem, the general object of the present invention is overcoming it in an efficient manner.

The main scope of the present invention is providing a method and network element for providing the feature of re-transmission of Ethernet frames over a transport SDH/SONET network at a low layer level, in an efficient and faster manner with respect to the known solutions.

An additional scope of the present invention is providing such a method that could be implemented in hardware.

The above and further objects of the present invention are obtained by a method and a network element according to claims 1 and 5, respectively. Further advantageous features of the present invention are set forth in respective dependent claims. All the claims are intended as an integral part of the present description.

The basic idea of the proposed solution is to store, at the Link transmitter of the starting network element, a copy of the received frames to be sent to a receiving network element. The frames are stored until the Link receiver of receiving network element provides the confirmation that the frames have been successfully transported over the SDH network.

The present invention operates through a new layer/network which is provided over the SDH/SONET network in order to manage the transport of Ethernet traffic over SDH/SONET network; this new layer/network uses the resources of SDH/SONET network in such a way as to optimize the provided services and the performances with reference to this specific type of transport. Such a new layer has been fully disclosed and claimed in a previous patent application (EP02290445.2) of the same applicant of the present one. The content of it is fully incorporated herewith as reference.

BRIEF DESCRIPTION OF THE DRAWINGS

The present invention will become clear in view of the following detailed description, to be read having reference to the attached sheets of drawings, wherein.

BEST MODE FOR CARRYING OUT THE INVENTION

As said above, the present invention operates in a layer/network which is termed NETS (i.e. Network of Ethernet Transport over SDH/SONET) and is disclosed in EP02290445.2 which is fully incorporated herewith as reference. The NETS comprises basic elements that are listed below for a better comprehension of the present invention.

Figure 1:
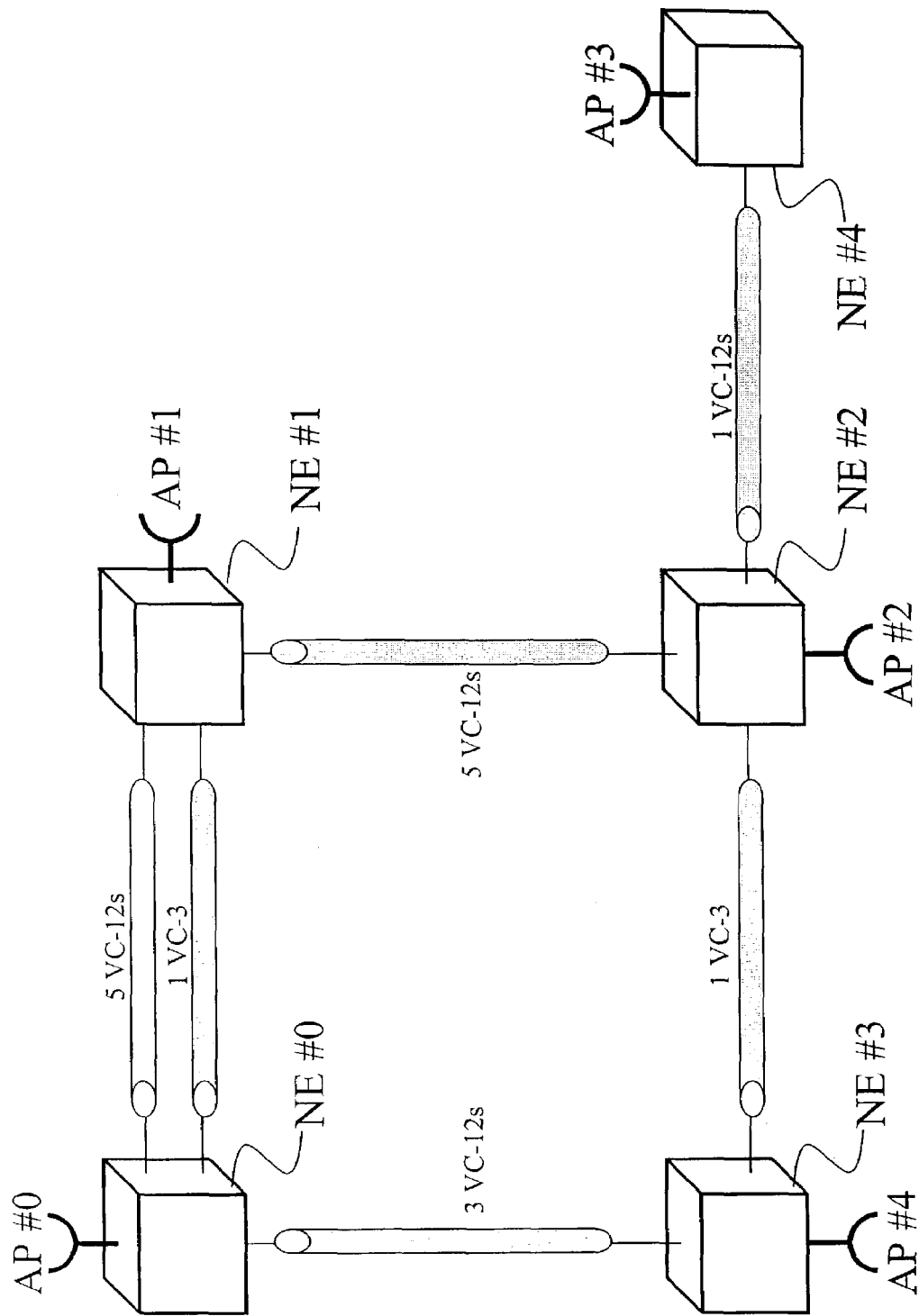
FIG. 1 shows the structure of a VPN and relating circuits and it is similar to FIG. 1 of EP02290445.2.

The NETS model comprises five basic elements: Access Point, Link, Circuit, Pipe and Path. An Access Point (AP) is an Ethernet interface at the boundary of an SDH/SONET network; it is the point where the Ethernet traffic can access/leave the SDH/SONET network. FIG. 1 depicts a simple example of network comprising five Network Elements (NE #0 to NE #4) with each network element having an Access Point: NE #0 has AP #0, NE #1 has AP #1, NE #2 has AP #2, NE #3 has AP #4 and finally NE #4 has AP #3. Naturally, a Network Element can host more than one Access Point.

A pair of Ethernet Access Points defines a point to point connection; this connection is named Link. For instance, with reference to FIG. 1, the pair AP #0 & AP #1 identifies a link; the couple AP #2 & AP #4 defines another link, and so on.

An SDH/SONET network could allow for the connection of two Access Points (i.e. to accomplish a Link) by means of different routes; every route is named Circuit. A Circuit is obtained by a Pipe concatenation and could be considered as a series connection of N Pipes.

In its turn, every Circuit/route that connects two Access Points can be divided into a sequence of smaller segments; every segment is named Pipe.

The basic pipeline is the Virtual Container that connects two Network Elements; it is named Path.

Figure 2:
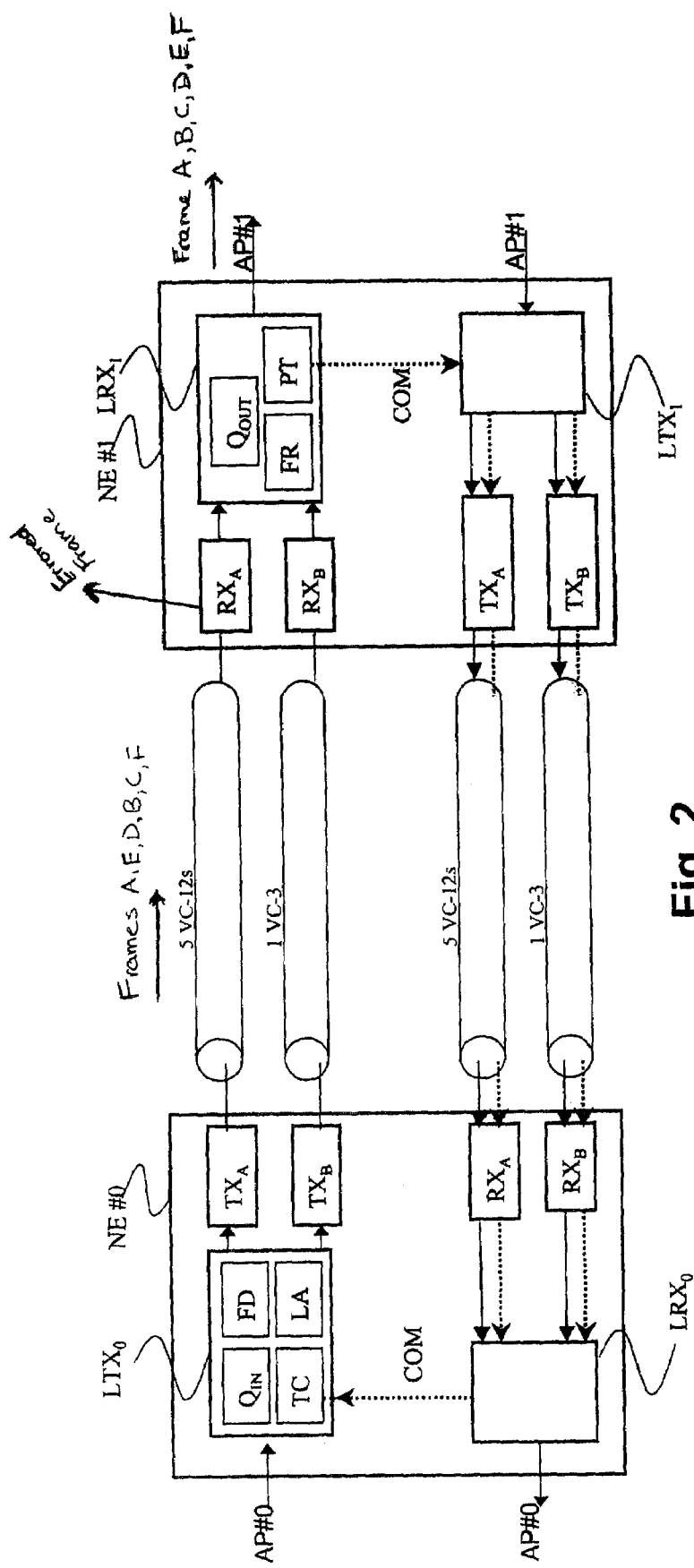
FIG. 2 shows in greater detail a Link connecting AP#0 of NE #0 and AP #1 of NE #1.

FIG. 2 depicts a Link connecting Access Points AP#0 and AP#1 (at NE#0 and NE#1, respectively), with two related circuits, Circuit a and Circuit b. Circuit a, in the example, comprises five VC-12 while Circuit b comprises a single VC-3. For simplicity purposes, let consider the direction from NE #0 to NE #1; naturally, the solution according to the present invention is applied to both directions.

At NE#0, the Ethernet frames incoming through AP#0 are stored into a queue buffer $Q_{IN}$ of Link transmitter $LTX_0$ of NE #0; let consider a sequence of frames (not shown) labeled as A, B, C, D, E, F etc. . . .

The output of incoming Ethernet frame queue buffer $Q_{IN}$ of Link transmitter $LTX_0$ of NE #0 is provided to a frame dispatcher FD assigning a frame to every Virtual Container either of Circuit a or Circuit b. For instance, frame A is assigned to VC-12 #1, frame B to VC-12 #2, frame C to VC-12 #3 . . . and frame F to VC-3. During such an assignment operation, a corresponding sequence label/number is attached to every frame by a label assignor LA to allow the frames re-ordering (FR) at the ending point. The frames are mapped and transmitted through transmitters $Tx_a$ and $TX_b$ of circuits a and b, respectively.

At NE #1, the frames are received by respective receivers $RX_a$ and $RX_b$ and provided to $LRX_1$. The Link receiver $LRX_1$ of NE #1 receives Ethernet frames from both the Circuits a and b; due to the skew between the two different routes, the sequence of received Ethernet frames can differ from the frame sequence at AP #0 (starting point).

A frame re-ordering operation, performed by frame re-ordering block FR, is required before providing the received frames to AP #1 for their output.

Through a fast communication channel COM, shown in FIG. 2, the status of the re-ordering operation in Link receiver $LRX_1$ of NE #1 is provided to Link transmitter $LTX_0$ of NE #0. By means of status information, the Link transmitter can detect the loss of one or more frames and can provide the re-transmission of the lost frame(s), if any.

The basic idea is that the Link transmitter $LTX_0$ of NE #0 stores and maintains in the incoming queue $Q_{IN}$ the received frames until the Link receiver $LRX_1$ of NE #1 provides the confirmation that the frames have been successfully transported over the transport SDH/SONET network. When this confirmation has been received, the related frames are removed from the incoming queue; otherwise the frames are re-transmitted.

Advantageously, the information exchange and the re-transmission are completely managed at hardware level and are quite fast.

There now follows a more detailed description of the present invention.

According to the present invention, two different types of retransmission could be managed, namely, re-transmission of multiple frames and re-transmission of a single frame. The re-transmission of multiple frames will be considered first.

With reference to FIG. 2, let consider Link AP #0-AP #1 with the two related Circuits a and b. The multiple re-transmission is managed according to the following steps:

Every frame of the incoming queue is assigned either to Circuit a or b.

The selected Circuit performs the transport of the frame to NE #1. Let consider the sequence of frames received by NE #1 is A, E, D, B, C, F, etc.

Due to the skew between the two different routes, the sequence of received Ethernet frames can differs from the original frame sequence at AP #0. According to the present invention, at every network element, a pointer (PT) of last re-ordered frame is provided for re-arranging the order of the received frames. Thus, the Link receiver of NE #1 should re-order the received frames according to the following steps:

Reception of frame A: the pointer of the last re-ordered frame is set to A and frame A is provided to AP #1;

Reception of frame E: frame E is stored but the re-ordering pointer is maintained equal to A;

Reception of frame D: frame D is stored but the re-ordering pointer is maintained equal to A;

Reception of frame B: frame B is stored, the re-ordering pointer is set to B and the frame is provided to AP #1;

Reception of frame C: frame C is stored, the re-ordering pointer is set to E and frames C, D and E are provided to AP #1;

Reception of frame F: the re-ordering pointer is set to F and the frame is provided to AP #1 and so on.

By means of the communication channel COM, the re-ordering pointer value is provided to the Link transmitter $LTX_0$ of NE #0.

Link transmitter $LTX_0$ of NE #0 discharges the stored frame A upon receiving a value of re-ordering pointer equal to A.

In fact, a re-ordering pointer equal to A means that NE #1 has successfully received and stored frame A and that is not necessary to maintain a copy thereof in the queue of the Link transmitter anymore.

The same will be for frame B that is stored at NE #0 in $LTX_0$: upon receiving a value of re-ordering pointer equal to B, frame B will be discarded.

Link transmitter $LTX_0$ discharges frames C, D and E when the re-ordering pointer value becomes equal to E: again, the new value of the re-ordering pointer guarantees all these frames have been successfully transported up to the ending point.

Finally, Link transmitter $LTX_0$ discharges stored frame F when the received re-ordering pointer value is equal to F.

Above, the way by which the Link transmitter LTX and the Link receiver LRX manage the related Ethernet queue when none frame have been lost has been disclosed.

Let consider frames C and D have been lost between NE #0 and NE #1: the new sequence of events is herebelow reported:

Every frame of the incoming queue is assigned either to Circuit a or b. The selected Circuit performs the transport of the frame to NE #1.

Let consider the sequence of frames received by NE #1 is A, E, B, F, etc. and frames C and D have been lost.

The Link receiver $LRX_1$ of NE #1 re-orders the received frames according to the following steps:

Reception of frame A: the pointer of the last re-ordered frame is set to A and the frame A is provided to AP #1;

Reception of frame E: the frame E is stored but the re-ordering pointer value is maintained equal to A;

Reception of frame B: the frame is stored, the re-ordering pointer is set to B and the frame B is provided to AP #1;

Reception of frame F: the frame is stored, but the re-ordering pointer is maintained equal to B, etc.

By means of the communication channel COM, the re-ordering pointer value is provided to the Link transmitter $LTX_0$ of NE #0.

As in the above example (when no frames were lost), Link transmitter $LTX_0$ of NE #0 discharges the stored frame A upon reception of re-ordering pointer value equal to A.

A re-ordering pointer equal to A means NE #1 has successfully received and stored the frame and that is not necessary to maintain a copy thereof in the queue of the Link transmitter anymore.

The same will be for frame B that is stored at NE #0 in $LTX_0$: upon receiving a value of re-ordering pointer equal to B, frame B will be discarded.

Due to the loss of frames C and D, the re-ordering pointer value at $LRX_1$ will not change: the Link transmitter $LTX_0$ can not discharge any frame and the Link receiver $LRX_1$ can not provide any frame to AP #1 after frame B.

Advantageously, a time counter TC in Link transmitter $LTX_0$ detects this lock condition: the counter expires when the same value of re-ordering pointer is received for a certain fixed time.

As a consequence of timer expiration, the Link transmitter $LTX_0$ re-transmits all the stored frames from C beyond (i.e. C, D, E, F, etc.).

The Link receiver $LRX_1$ makes a check of the received frames: it stores frames C and D (that were never received) and discharges frames E, F, etc. because already stored.

At this moment, the re-ordering pointer is set to F (or to a following/higher value). Upon the reception of re-ordering pointer equal to F (or to a following value) the Link transmitter discharges frames C, D, E, F, etc.

The regular condition has been restored and the steps of transmission, reception and discharge of frames will continue as usual.

The same sequence of frames received at AP #0 is thus provided at AP #1; a traffic monitor on AP #1 just detects a short pause between the transmission of frame B and the following ones due to the recovery time of the re-transmission function.

Another type of approach could be the re-transmission of just a single frame after the timeout event. For instance, we suppose that in the previous example, just frame C should be re-transmitted.

Due to the fact that frame D has been lost too, a lock condition is detected again and, after a second timeout event, frame D is re-transmitted too and the regular condition is restored.

The restoring operation requires one timeout event for every lost frame and, in principle, it is less efficient. Anyway, the proposed solution provides the capability to re-transmit a single frame too.

This event can occur when the Link receiver $LRX_1$ of NE #1 receives a frame with a correct sequence label but with the information field affected by errors; for instance, this is possible when an Ethernet frame is encapsulated into a GFP format that provides different CRCs for the header and the information field.

The Link receiver (for instance $LRX_1$) that detects such a condition could discharge the frame (e.g. frame C) so that errored data are not forwarded; frame C is not stored in the queue and the resulting condition is the same as the frame has been lost along the path from NE #0 and NE #1.

This event leads to a lock condition as previously described; the reordering pointer is locked to B value; frame C and the following ones would be re-transmitted when the timeout occurs.

The main difference with respect to the previous example is that NE #1 knows that one frame has been discharged/lost and it also knows the sequence label of the frame too.

In order to optimize the recovery time, the frame re-transmission is managed according to the following steps.

As soon as the Link receiver LRX, has discharged frame C, it forwards a re-transmission request of a single frame (i.e. frame C) to the Link transmitter $LTX_0$ by means of the communication channel COM.

Upon the reception of this request, the Link transmitter $LTX_0$ re-transmits frame C.

The regular condition has been restored and the steps of transmission, reception, discharge of the frames continues as usual.

With respect to the re-transmission of multiple frames, this solution has two main advantages:

The re-transmission is performed as soon as possible without awaiting any timeout event.

No bandwidth is occupied to re-transmit frames that have been already stored in the queue of the Link receiver.

Both types of re-transmissions are managed at hardware level so this feature is accomplished in an efficient and fast way.

There have thus been shown and described a novel method and a novel network element which fulfill all the objects and advantages sought therefor. Many changes, modifications, variations and other uses and applications of the subject invention will, however, become apparent to those skilled in the art after considering the specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. A method for safely transporting an Ethernet signal through a pipe from a sending point to a receiving point over at least one synchronous digital hierarchy (SDH) or a synchronous optical networking (SONET) network, the at least one SDH/SONET network comprising network elements or nodes, fiber connections connecting the network elements and SDH/SONET virtual containers, the transport being managed through a new layer over SDH/SONET network physical layer, the new layer comprising Access Points, links of Access Point pairs and circuits, namely the possible routes for connecting a pair of Access Points, wherein the method comprises:

at the sending point, receiving Ethernet frames to be transported through an Access Point; mapping the Ethernet frames into Virtual Containers; assigning a label to every frame according to a sequence; storing a copy of the sent labeled frames; and at the receiving point, receiving the sent labeled frames; re-ordering the received frames according to the assigned sequence label; updating the value of a pointer according to the label of the last correct frame of the sequence; and outputting the frames through an Access Point.

2. A method according to claim 1, further comprising transmitting the updated pointer value to the transmission point, comprising:
- at the sending point, discarding the copy the sent labeled frames that have been duly received at the receiving point, and
- at the receiving point, keeping only the labeled frames whose label is higher than the pointer value, the rest of labeled frames being outputted through the access point.

3. A method according to claim 1, further comprising, at the sending point, activating a time counter when the pointer has been updated and, in case the time counter expires, re-sending at least the frame whose label is the next of the one corresponding to the pointer value.

4. A method according to claim 1, further comprising discarding, at the receiving point any errored frames and requesting to the sending point a re-sending of the discarded frames.

5. The method according to claim 1, wherein the new layer comprises access points, links of access point pairs and circuits, which are the possible routes for connecting a pair of access points; and
- wherein the new layer is a model which resides over the SDH or SONET network and manages ethernet traffic using resources of the SDH or SONET network.

6. The method according to claim 1, wherein the sequence is a predetermined order for frames to be transmitted, and wherein the last correct frame is the last frame received in the predetermined order.

7. A Network Element of a SDH/SONET network able to transport an Ethernet signal through a pipe from a sending point to a receiving point over at least one synchronous digital hierarchy (SDH) or a synchronous optical networking (SONET) network, the at least one SDH/SONET network comprising further network elements or nodes, fiber connections connecting the network elements and SDH/SONET virtual containers, the transport being managed through a new layer over SDH/SONET network physical layer, the new layer comprising Access Points, links of Access Point pairs and circuits, namely the possible routes for connecting a pair of Access Points, the network element being characterized by comprising:
- an Access Point receiving Ethernet frames to be transported; mapping means for mapping the Ethernet frames into Virtual Containers; a label assignor assigning a label to every frame according to a sequence; a memory for storing a copy of the sent labeled frames; and
- a receiver for receiving the sent labeled frames; means for re-ordering the received frames according to the assigned sequence label; a pointer and means for updating the value thereof according to the label of the last correct frame of the sequence; and an Access Point for outputting the frames.

8. A network element according to claim 7, further comprising a pointer status communication channel for transmitting the updated pointer value to the transmission point comprising:
- at the sending point, means for discarding the copy of those sent labeled frames that have been duly received at the receiving point,
- at the receiving point, a memory for keeping only the labeled frames whose label is higher than the pointer value, the rest of labeled frames being outputted through the access point.

9. A network element according to claim 7, further comprising, at the sending point, a time counter which is activated when the pointer has been updated and, in case the time counter expires, means for re-sending at least the frame whose label is the next of the one corresponding to the pointer value.

10. A Network Element according to claim 7, further comprising means for discarding, at the receiving point any errored frames and requesting to the sending point are sending of the discarded frames.

* * * * *